UNITED STATES PATENT OFFICE.

VICTOR CLAIREMONT, OF SAN FRANCISCO, CALIFORNIA, ASSIGNOR TO NATIONAL EGG COMPANY, OF SAN FRANCISCO, CALIFORNIA, A CORPORATION OF CALIFORNIA.

PROCESS OF PRESERVING EGGS.

1,092,897.

No Drawing.

Specification of Letters Patent. Patented Apr. 14, 1914.

Application filed March 31, 1913. Serial No. 758,067.

*To all whom it may concern:*

Be it known that I, VICTOR CLAIREMONT, a citizen of the United States, and resident of San Franciso, in the county of San Francisco and State of California, have invented certain new and useful Improvements in Processes of Preserving Eggs; and I do hereby declare the following to be a full, clear, and exact description of the same.

The object of this invention is to provide a process whereby eggs may be preserved in a pure and edible condition for a long period of time. From investigations made by me I have reached the conclusion that the principal causes of egg deterioration may be classed under three headings:—first, partial development of the embryo; second, changes produced by bacterial action upon the egg content; and third, absorption of foreign odors and flavors from the surrounding air and the evaporation of moisture from the egg due to air circulation, thereby producing what is commonly termed "shrunken eggs". The first cause of deterioration may be prevented by producing non-fertile eggs and also to a certain degree by keeping the eggs at a very low temperature, but in spite of the best precautions much of the deterioration in the commercial preservation of eggs is due to this cause. The second cause of deterioration may also, to a certain extent, be controlled by producing eggs under clean and sanitary conditions and by keeping the eggs at a low temperature. Nevertheless, where eggs are kept even at a temperature just above the freezing point of the egg, bacteria in time enter through the pores of the shell and noticeable deterioration takes place. The third cause of deterioration has commercially received less consideration than either of the first two causes referred to, but it is very clear that the absorption of odors and flavors from the air and the evaporation of the moisture of the egg are factors of extreme importance which must be overcome if material deterioration is to be prevented.

In accordance with the method of the present invention it is proposed that by a simple treatment, the embryo development shall be checked, the bacterial life on and in the shell destroyed, the shell sealed to prevent the entrance of bacteria through the same, or the penetration of foreign odors and flavors from the surrounding air, as well as the prevention of the exaporation of the moisture content of the egg.

The invention depends for its success upon my discovery of the fact that by subjecting the eggs for an exceedingly brief period of time to a temperature considerably above the temperature of boiling water, preferably approximately from 250° to 280° F. and applying to the eggs a sealing solution, the characteristics of the egg content and its edibility are not perceptibly changed, due apparently to the fact that the action of the heat, while not noticeably coagulating the albumen within the inner skin, seemingly does coagulate the substance immediately adjacent the inner surface of the shell forming a resistant and sealing coating which, in connection with the coating solution on the outer surface of the shell serves to effectually preserve the egg substance without further change, for long periods of time.

In the practical development of the process it is, of course, highly desirable that a certain orderly procedure should be followed both to facilitate the rapidity with which the eggs may be treated and to prevent destruction of the eggs being processed, and therefore it is advisable to temper the shell of the egg before it is dipped into the more highly heated solution, and to cool the eggs after such dipping to arrest the action of the heat and leave the eggs ready for storage or shipment.

In practical operation it is preferred that the eggs shall be first dipped into a solution which is heated only to about 100° F. and kept immersed therein for a period of ten seconds or thereabout, after which the eggs are immediately dipped in a solution heated to a degree in excess of 250° F., or it may be even as high as 280° F., in which solution they are immersed for a period of fifteen seconds or thereabout, and are immediately afterward dipped into a cold solution. The dipping into the cold solution is not essential, but is desirable if the eggs are to be kept for a long time, inasmuch as the cold solution assists in forming a final coating and the closing of any of the pores of the egg that are still open and through which bacteria might enter. The solution which is employed for dipping the eggs at the higher temperature must, if used at atmospheric pressure, be a liquid which has a high boiling point or a boiling point at the temperature it is desired to maintain, and it is preferably a liquid which will form a sealing coating on the outside of the shell. Such a liquid is the liquid described in U. S. Patent No. 999,589, granted August 1, 1911, and I have found from practical experience that the liquid described in said patent is practically efficient and may be raised to the temperature necessary at atmospheric pressure.

After the eggs have been finally dipped or treated they should be left to dry for a short period, when they can be put into ordinary cases and stored until ready for sale.

From experience in the preservation of eggs for long periods by the above described process, it is concluded that the hot solution not only kills very effectually the germs on the eggs' shells, but by expanding the shells and opening the pores, lets out the air and immediately closes the pores by the sealing action before referred to. When the solution employed forms a sealing coating on the outer surface of the shell it would seem that the shell is sealed both from the inner and outer sides, giving a double protection against the entrance of bacterial life or the absorption or passage of gases or fluid through the shell, with the result that deterioration from any cause is effectually prevented.

While the particular solution referred to in Patent 999,589, has been mentioned herein, it is obvious that other solutions capable of being heated to the desired temperature and which will form a sealing coating may be used without departing from the invention.

Practical experience has shown that eggs treated as herein described will keep in a fresh state of preservation and as long as ten months without being placed in cold storage or keeping the temperature lower than between fifty or sixty degrees during that period.

While the high temperatures before referred to have been found to give the most satisfactory results I do not wish to be understood as restricting the claims, save where directly stated to such high temperatures, for while practical experience extending over a long period has shown that the best commercial results are attained where the temperature employed is at or above 250° F., it may be possible to employ a lower temperature with a longer exposure of the eggs thereto. The temperature, however, must be considerably above that of boiling water or high enough to destroy the spore germs as well as the non-spore forming germs, or to render them practically innocuous, without causing a deterioration of the edible portion of the egg such as would render it unfit for any of the uses to which fresh eggs are ordinarily put. Such practical experience has demonstrated that eggs treated in accordance with this process will be preserved without change, for practically an unlimited time, and when used may be treated just as are fresh eggs, the process permitting of no chemical or bacterial changes and the coating material being itself of a non-changing, but edible character.

Having thus described my invention what I claim and desire to secure by Letters Patent of the United States is,—

1. A process of preserving eggs which consists in coagulating the albumen of the egg content immediately in contact with the inner side of the shell without affecting the edible portion by suddenly subjecting the eggs to a higher temperature than that of boiling water for a short period of time, and in applying a sealing coating to the outer side of the shell while in a heated condition.

2. The process of preserving eggs, which consists in immersing the eggs in a solution adapted to form a sealing coating and heated to a temperature of approximately 250° F. for a period of time sufficient only to coagulate the albumen content in immediate contact with the inner side of the shell and render innocuous the germ spores on the exterior of the shell without affecting the edible portion of the egg.

3. The process of preserving eggs which consists in first immersing the eggs in a solution heated to a comparatively low temperature (approximately 100° F.) for a brief period of time to temper the shell and in immediately thereafter immersing the eggs in a solution heated to 250° F. or upward for a period of time insufficient to noticeably coagulate the albumen contents save in immediate proximity to the shell, and in subsequently cooling said eggs.

4. The process of preserving eggs which consists in first tempering the shells by subjecting the eggs to a moderate degree of heat, secondly, while still warm, immersing the eggs in a solution heated to a temperature in excess of 250° F., and in applying a sealing coating to the outer side of the shell.

VICTOR CLAIREMONT.

Witnesses:
 WALTER J. ROWLEY,
 JAMES D. WHALEN.